US012610895B2

(12) United States Patent
Jin et al.

(10) Patent No.: US 12,610,895 B2
(45) Date of Patent: Apr. 28, 2026

(54) AUTOMATIC ROCK WOOL BLOCK FILLING APPARATUS

(71) Applicant: LONGMEN LABORATORY, Luoyang (CN)

(72) Inventors: Xin Jin, Luoyang (CN); Xiaowu Zhu, Luoyang (CN); Wenshen Pan, Luoyang (CN); Mingyong Li, Luoyang (CN); Yidong Ma, Luoyang (CN); Xiaolin Xie, Luoyang (CN); Bo Zhao, Luoyang (CN)

(73) Assignee: LONGMEN LABORATORY, Luoyang (CN)

( * ) Notice: Subject to any disclaimer, the term of this patent is extended or adjusted under 35 U.S.C. 154(b) by 0 days.

(21) Appl. No.: 19/286,480

(22) Filed: Jul. 31, 2025

(65) Prior Publication Data

US 2026/0076312 A1 Mar. 19, 2026

Related U.S. Application Data

(63) Continuation of application No. PCT/CN2024/139199, filed on Dec. 13, 2024.

(30) Foreign Application Priority Data

Sep. 18, 2024 (CN) .......................... 202411297195.0

(51) Int. Cl.
*A01G 9/08* (2006.01)

(52) U.S. Cl.
CPC .................................... *A01G 9/081* (2013.01)

(58) Field of Classification Search
CPC ...... A01G 9/081; A01G 9/0293; A01G 9/083; A01G 31/02
See application file for complete search history.

(56) References Cited

U.S. PATENT DOCUMENTS 4,008,543 A * 2/1977 Vilt ......................... A01G 9/081
47/1.01 R
2017/0094896 A1* 4/2017 Van Der Knaap ..... A01G 24/44

FOREIGN PATENT DOCUMENTS

CN 212414024 U 1/2021
CN 113475270 A 10/2021
(Continued)

OTHER PUBLICATIONS

China National Intellectual Property Administration, First Office Action in Chinese Patent Application No. 202411297195.0 issued on Oct. 25, 2024, which is a foreign application corresponding to this U.S. Patent Application, to which this application claims priority.

(Continued)

*Primary Examiner* — Andrew M Tecco
(74) *Attorney, Agent, or Firm* — BSJ & SUN LLC

(57) ABSTRACT

An automatic rock wool block filling apparatus is provided. The automatic filling apparatus includes a supporting mechanism, a feeding mechanism, an orientation adjusting mechanism, a pressing mechanism and a seedling raising tray moving mechanism. A rock wool block can be fed into the orientation adjusting mechanism through the feeding mechanism. The rock wool block can fall onto the seedling raising tray in a forward state that "a concave arc surface faces upwards and a flat surface faces downwards" through the orientation adjusting mechanism. The rock wool block falling onto the seedling raising tray can be pressed into a hole to be filled through the pressing mechanism. The hole to be filled in the seedling raising tray can be moved to a target position through the seedling raising tray moving mechanism. Thus, the feeding, orientation adjusting and pressing operations of the rock wool block are completed.

8 Claims, 5 Drawing Sheets

(56)         References Cited

FOREIGN PATENT DOCUMENTS

| CN | 113853994 A | 12/2021 |
|----|-------------|---------|
| CN | 113979346 A | 1/2022 |
| CN | 115943868 A | 4/2023 |
| CN | 118805666 A | 10/2024 |
| JP | H0538231 A | 2/1993 |
| JP | H06225641 A | 8/1994 |
| JP | 3526862 B1 | 5/2004 |
| JP | 2023069787 A | 5/2023 |

OTHER PUBLICATIONS

China National Intellectual Property Administration, Notification to Grant Invention Patent Right in Chinese Patent Application No. 202411297195.0 issued on Nov. 9, 2024, which is a foreign application corresponding to this U. S. Patent Application, to which this application claims priority.

International Search Report of the International Searching Authority for State Intellectual Property Office of the People's Republic of China in PCT application No. PCT/CN2024/139199 issued on May 24, 2025, which is an international application to which this U.S application claims priority.

\* cited by examiner

114

110

112

100

Orientation adjusting mechanism          60

50

40                    70

Feeding mechanism          Controller          Pressing mechanism

First visual identification system          Seedling raising tray moving mechanism          Second visual identification system 90a                    80                    90b

AUTOMATIC ROCK WOOL BLOCK FILLING APPARATUS

CROSS-REFERENCE TO RELATED APPLICATIONS

This application is a continuation application of international application No. PCT/CN2024/139199, filed on Dec. 13, 2024, which claims priority to Chinese Patent Application No. 202411297195.0, filed on Sep. 18, 2024, the disclosures of which are herein incorporated by reference in their entireties.

TECHNICAL FIELD

The present disclosure relates to the technical field of seedling raising devices, and specifically, to an automatic rock wool block filling apparatus.

BACKGROUND

By accurately controlling the growth environment during industrialized seedling raising, the seedling quality and survival rate can be significantly improved, the seedling raising period can be shortened, resources can be saved, the environment can be protected, and efficient and standardized production can be achieved, which can bring significant economic benefits for modern agriculture, and improving the production efficiency.

A rock wool block, as a new seedling raising matrix, is formed by natural rock after high-temperature melting, has good air permeability and water retention, and can provide a good growth environment for seedlings. Before industrialized seedling raising, the rock wool block needs to be filled into a foamed seedling raising tray. The rock wool block typically is cylindrical and has different shapes at two ends (e.g., one end is a flat surface and the other end is a concave arc surface). During filling the rock wool blocks into a seedling raising tray, the concave arc surface needs to face upwards, that is, the rock wool block is in a forward state, to facilitate subsequent seeding. When filing the rock wool block into a seedling tray manually, the labor strength is high and the efficiency is low, and the irritating fine fiber and the potential chemical components may stimulate skin cells and trigger allergic reactions.

SUMMARY

In order to solve the defects in the prior art, the present disclosure provides an automatic rock wool block filling apparatus. By using the filling apparatus, the rock wool block filling process is automatic and convenient to control, the rock wool block filling operation can be completed efficiently and accurately, and the filling efficiency can be improved.

In one aspect, an automatic rock wool block filling apparatus is provided. A rock wool block is a cylinder as a whole, with one end being a concave arc surface, and the other end being a flat surface. The automatic rock wool block filling apparatus includes:

a controller;

a supporting mechanism for playing a supporting role;

a feeding mechanism, disposed at a left end of the supporting mechanism and including a push-plate feeding component electrically connected to the controller and a first belt conveyor disposed on a rear side of the push-plate feeding component and electrically connected to the controller, where the rock wool block is conveyed onto the first belt conveyor by the push-plate feeding component and is then conveyed to a next mechanism by the first belt conveyor;

an orientation adjusting mechanism, disposed on the supporting mechanism and located on a right side of the first belt conveyor, configured to adjust an orientation of the rock wool block to enable the rock wool block to fall from the orientation adjusting mechanism onto a seedling raising tray in a forward state that "a concave arc surface faces upwards and a flat surface faces downwards", and including a fixed support fixed to the supporting mechanism, where an orientation adjusting motor electrically connected to the controller is disposed at an upper part of the fixed support, a second belt conveyor electrically connected to the controller is disposed at a lower part of the fixed support, a gap only for one rock wool block in a vertical state to pass through is disposed between a right end of a conveying belt in the second belt conveyor and a right end of the fixed support, an output shaft of the orientation adjusting motor extends through the fixed support and connects to a circular disk, the circular disk is provided with two orientation adjusting pipes that are arranged symmetrically around the center of the circular disk, an included angle between a feed inlet and a feed outlet of the orientation adjusting pipe is an obtuse angle, at a corner of the orientation adjusting pipe, a retaining post inclined to the direction of the feed inlet is provided, the rock wool block falling into the orientation adjusting pipe in a forward state from the feed inlet of the pipe can fall out from the feed outlet onto the second belt conveyor directly along the pipe, the rock wool block falling into the pipe in a reverse state is blocked by the retaining post and can only fall onto the second belt conveyor along an original path until the feed inlet of the orientation adjusting pipe rotates downwards, and the rock wool block falls onto the seedling raising tray from the gap under the action of the second belt conveyor;

a pressing mechanism, disposed at a right end of the fixed support and including a vertical plate disposed on the fixed support, where a pressing motor electrically connected to the controller is fixed to the vertical plate by a motor fixing seat, a pressing gear is connected to an output shaft of the pressing motor, the vertical plate is provided with a slide rail, the slide rail is provided with a pressing rack meshed with the pressing gear, a pressing rod disposed directly opposite to the gap is fixed at a lower end of the pressing rack, and the pressing rod can be driven by the pressing motor to move up and down, so as to press the rock wool block to a target position;

a seedling raising tray moving mechanism, disposed at a right end of the supporting mechanism, configured to support and move the seedling raising tray, and including a longitudinal driving component electrically connected to the controller and a transverse driving component disposed on the longitudinal driving component and electrically connected to the controller, where the hole to be filled in the seedling raising tray can be moved to a position right below the gap by the transverse driving component and the longitudinal driving component; and two visual identification systems, disposed on the feeding mechanism and the orientation adjusting mechanism respectively, where by means of cooperation between the controller and the visual identification systems, the rock wool block on the first belt conveyor just falls into the orientation adjusting pipe, and the rock wool block falling from the second belt conveyor just falls to the target position of the seedling raising tray.

In some embodiments, the push-plate feeding component further includes a supporting frame and a storage box that are disposed at a left end of the supporting mechanism and communicate with each other vertically, the first belt conveyor is connected to a rear side of the storage box by a carrier plate, the storage box includes two risers disposed oppositely, a fixed bottom plate vertically disposed at a front section of the two risers, and a stepped bottom plate vertically disposed at a rear section of the two risers, the stepped bottom plate includes a plurality of fixed plates and push-pull plates that are disposed between the two risers in a staggered manner and that are in stepped layout, the thickness of the fixed plate and the push-pull plate equals to the diameter of the rock wool block, the plurality of fixed plates are fixedly connected between the two risers, and a feeding rack extending vertically is fixed at lower ends of the plurality of push-pull plates by a connector; and a feeding motor is disposed in the supporting frame, a feeding gear is connected to an output shaft of the feeding motor, the feeding gear is meshed with the feeding rack, and under the action of the feeding motor, the plurality of push-pull plates synchronously move up and down relative to the fixed plates, so as to drive the rock wool block on the fixed bottom plate to stepwise move up to the highest position of the stepped bottom plate and then roll down onto the first belt conveyor.

In some embodiments, limiting baffles for preventing rock wool blocks from falling off are disposed on two sides of the conveying belt of the first belt conveyor along a length direction; and a connecting rod is connected to the middle of the two limiting baffles, and the connecting rod and the limiting baffles enclose a space that allows rock wool blocks in a horizontal state to pass through.

In some embodiments, a concave slide way whose left end is higher than right end is obliquely disposed at a right end of the first belt conveyor, the left end of the concave slide way is connected to the limiting baffle, and the right end of the concave slide way is flush with the bottom of the feed inlet of the orientation adjusting pipe.

In some embodiments, an end of the retaining post extending into the orientation adjusting pipe is a convex arc surface.

In some embodiments, the orientation adjusting pipe is fixed to the circular disk by a fixed block, the fixed block is provided with a clamping slot for mounting the retaining post, and the length of the retaining post is adjustable.

In some embodiments, two fixed rail baffles for limiting moving tracks of rock wool blocks are disposed on the fixed support right below the orientation adjusting pipe, and the two fixed rail baffles are respectively disposed on two sides of the conveying belt of the second belt conveyor along a length direction.

In some embodiments, a lower end of the pressing rod has a convex arc surface matched with the shape of the concave arc surface of the rock wool block.

In some embodiments, the pressing rod and the retaining post are both made of a rubber material.

In some embodiments, the transverse driving component and the longitudinal driving component both use a motor lead screw module.

Beneficial Effects of the Present Disclosure (1) The automatic rock wool block filling apparatus can implement automatic and accurate filling of rock wool blocks in an industrialized seedling raising process. Compared with a conventional manual filling manner, the automatic filling apparatus not only can improve production efficiency and reduce labor strength and production costs, but also can improve filling accuracy, and reduce human errors.

(2) The automatic rock wool block filling apparatus can implement lossless filling of rock wool blocks. By using the orientation adjusting mechanism and pressing mechanism, it ensures that rock wool blocks can be accurately placed at specified positions in a filling process, thereby avoiding extrusion or collision caused by a position deviation.

(3) Moving components in the automatic rock wool block filling apparatus are driven by a respective motor, and the apparatus not only can effectively and stably operate, but also has a compact structure, is simple in operation, and is easy to maintain.

Figure 1:
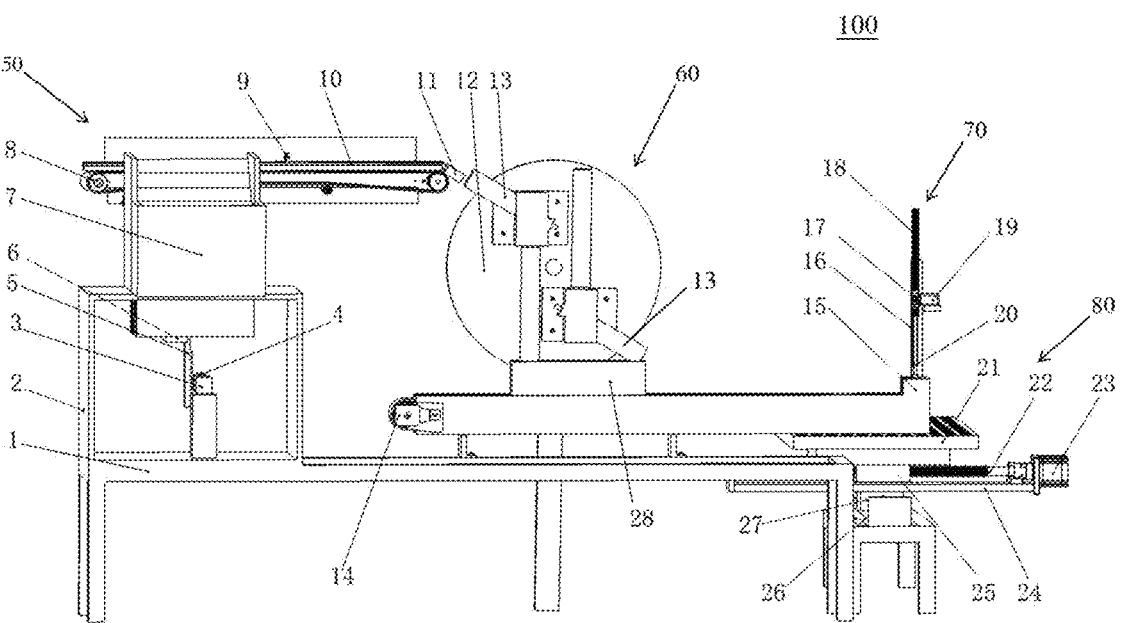
FIG. 1 is a front view of a rock wool block filling apparatus in the present disclosure.

Reference numerals: 1. supporting mechanism, 101. first bracket, 102. second bracket, 2. supporting frame, 3. feeding motor, 4. feeding gear, 5. feeding rack, 6. connector, 7. storage box, 701. fixed bottom plate, 702. riser, 703. fixed plate, 704. push-pull plate, 8. first belt conveyor, 9. connecting rod, 10. limiting baffle, 11. concave slide way, 12. circular disk, 13. orientation adjusting pipe, 14. second belt conveyor, 15. fixed support, 16. slide rail, 17. pressing gear, 18. pressing rack, 19. pressing motor, 20. pressing rod, 21. seedling raising tray, 22. second lead screw, 23. transverse movement motor, 24. second bottom plate, 25. second supporting component, 26. first bottom plate, 27. first supporting component, 28. fixed rail baffle, 29. fixed block, 30. first lead screw, 31. orientation adjusting motor, 32. longitudinal movement motor, 33. retaining post, and 34. gap.

DETAILED DESCRIPTION

The technical solutions of the present disclosure will be clearly and completely described below with reference to specific embodiments. Obviously, the described embodiments are merely some embodiments of the present disclosure rather than all of the embodiments. All other embodiments obtained by those of ordinary skill in the art based on the embodiments in the present disclosure without creative efforts shall fall within the scope of protection of the present disclosure.

In the description of the present disclosure, it should be understood that the orientation or position relationship indicated by the terms "upper" and "lower" is the orientation or position relationship based on the accompanying drawings, and is only for the convenience of describing the present disclosure and simplifying the description, rather than indicating or implying that the apparatus or element referred to must have a particular orientation or be constructed and operated in a particular orientation, and therefore will not be interpreted as limiting the scope of protection of the present disclosure.

It should be noted that the relational terms such as "first" and "second" are used only to distinguish an entity or operation from another entity or operation, and do not necessarily require or imply any actual relationship or sequence between these entities or operations. Moreover, the terms "comprise", "contain" or any other variants thereof are intended to cover non-exclusive inclusions. Therefore, a process, method, article or device including a series of elements includes not only those elements, but also other elements that are not explicitly listed, or further includes elements inherent to such process, method, article or device. Without more limitations, an element defined by the statement "include one . . . " does not exclude the existence of other same elements in the process, method, article or device that includes the element.

It should be noted that the rock wool block is a cylinder as a whole, with one end being a flat surface, and the other end being a concave arc surface. As shown in a schematic side view of a rock wool block 110 in FIG. 6, the rock wool block 110 has a flat surface 112 and a concave arc surface 114. For ease of description, the state in which "the concave arc surface faces upwards and the flat surface faces downwards" of the rock wool block is referred to as a "forward state" (because the state is also consistent with a final state of the rock wool block in the seedling raising tray 21), and the state in which "the concave arc surface faces downwards and the flat surface faces upwards" is referred to as a "reverse state". The case that the rock wool block is in a vertical state means that an axis of the rock wool block extends vertically, and the forward state and the reverse state are two forms of the rock wool block in the vertical state. The case that the rock wool block is in a horizontal state means that an axis of the rock wool block extends horizontally, that is, a state in which the rock wool block lies flat.

The present disclosure provides an automatic rock wool block filling apparatus 100 applicable to industrialized seedling raising. Referring to FIG. 1 to FIG. 5, the rock wool block apparatus 100 includes a supporting mechanism 1, a feeding mechanism 50, an orientation adjusting mechanism 60, a pressing mechanism 70, and a seedling raising tray moving mechanism 80. The feeding mechanism 50, the orientation adjusting mechanism 60, the pressing mechanism 70), and the seedling raising tray moving mechanism 80 are all fixed to the supporting mechanism 1. A rock wool block can be fed into the orientation adjusting mechanism 60 through the feeding mechanism 50. The rock wool block can fall onto a seedling raising tray 21 in a forward state. The forward state is a state in which a concave arc surface faces upwards and a flat surface faces downwards" through the orientation adjusting mechanism. The rock wool block falling onto the seedling raising tray 21 can be pressed into a hole to be filled through the pressing mechanism 70. The hole to be filled in the seedling raising tray 21 can be moved to a target position through the seedling raising tray moving mechanism 80. Thus, the feeding, orientation adjusting and pressing operations of the rock wool block are completed. The following describes mechanisms in detail.

Figure 2:
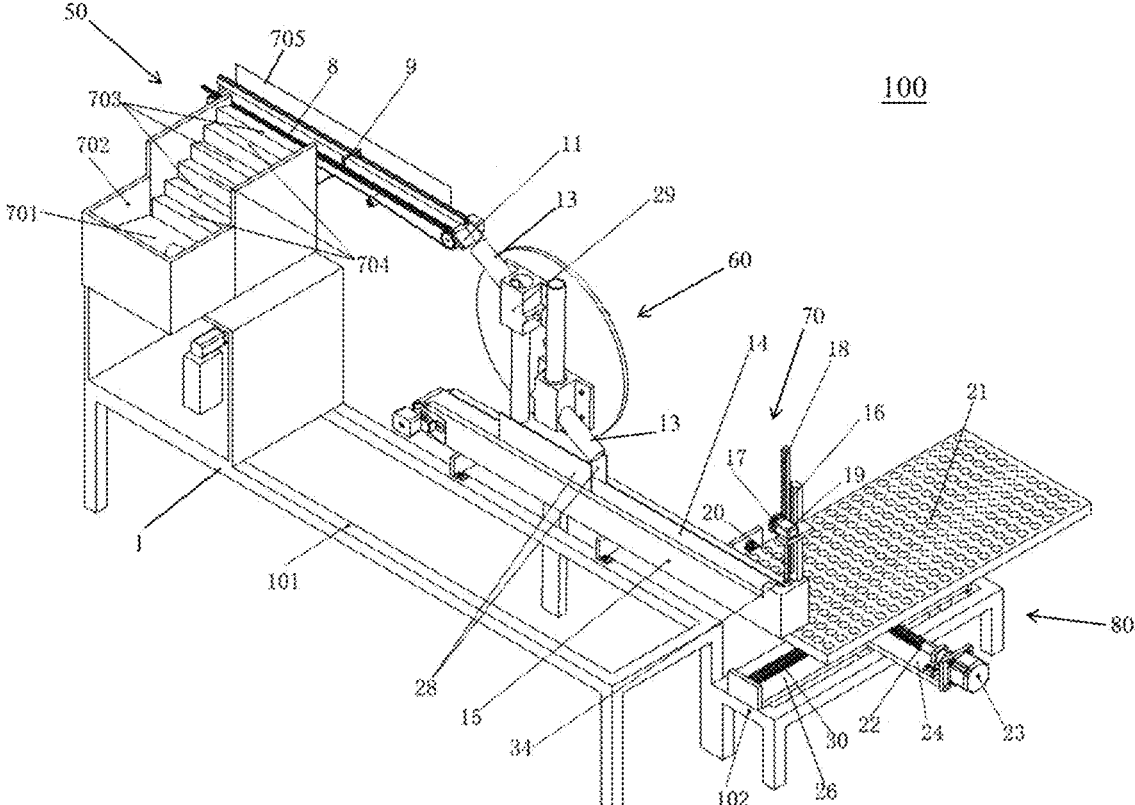
FIG. 2 is an axonometric view of the filling apparatus in the present disclosure.

Referring to FIG. 1 and FIG. 2, the supporting mechanism 1 includes a first bracket 101 and a second bracket 102 disposed on a right side of the first bracket 101. The first bracket 101 is provided with a feeding mechanism 50, an orientation adjusting mechanism 60, and a pressing mechanism 70 sequentially from left to right. The second bracket 102 is provided with a seedling raising tray moving mechanism 80. The height of the second bracket 102 is lower than the height of the first bracket 101, to facilitate the pressing operation of the pressing mechanism 70).

The feeding mechanism 50 includes a push-plate feeding component disposed at a left end of the first bracket 101 and a first belt conveyor 8 located on a rear side of the push-plate feeding component. The rock wool block is conveyed onto the first belt conveyor 8 by the push-plate feeding component, and then conveyed to the orientation adjusting mechanism 60 by the first belt conveyor 8.

Referring to FIG. 1 and FIG. 2, the push-plate feeding component includes a supporting frame 2 and a storage box 7 that are disposed on the first bracket 101 and communicate with each other vertically. The first belt conveyor 8 is connected to a rear side of the storage box 7 by a carrier plate. The storage box 7 includes two risers 702 disposed oppositely, a fixed bottom plate 701 vertically disposed at a front section of the two risers 702, and a stepped bottom plate vertically disposed at a rear section of the two risers 702. The stepped bottom plate includes a plurality of fixed plates 703 and a plurality of push-pull plates 704 that are disposed between the two risers 702 in a staggered manner and are in stepped layout. The thickness of the fixed plate 703 equals to the diameter of the rock wool block and the thickness of the push-pull plate 704 equals to the diameter of the rock wool block. The plurality of fixed plates 703 are fixedly connected between the two risers 702. A feeding rack 5 extending vertically is fixed at a lower end of the plurality of push-pull plates 704 by a connector 6. A feeding motor 3 is disposed in the supporting frame 2. The feeding motor 3 is fixed to the first bracket 101. A feeding gear 4 is connected to an output shaft of the feeding motor 3. The feeding gear 4 is meshed with the feeding rack 5. Under the action of the feeding motor 3, the plurality of push-pull plates 704 synchronously move up and down relative to the fixed plates 703, so as to drive the rock wool block on the fixed bottom plate 701 to stepwise move up to the highest position of the stepped bottom plate and then roll down onto the first belt conveyor 8.

Referring to FIG. 2, in some embodiments, three fixed plates 703 and three push-pull plates 704 are provided. The three fixed plates 703 and the three push-pull plates 704 are disposed in a staggered manner. The lower end of the stepped bottom plate is the push-pull plate 704, and the upper end of the stepped bottom plate is the fixed plate 703.

An L-shaped carrier plate 705 is fixed to a rear wall of the storage box 7. The first belt conveyor 8 is disposed in a space enclosed by a vertical section of the carrier plate 705 and the storage box 7. The first belt conveyor 8 includes two rollers that are rotatably mounted at two ends of the vertical section of the carrier plate 705. A conveying belt is looped around the two rollers. A conveying motor is mounted on the vertical section. An output shaft of the conveying motor passes through the vertical section and is connected to one of the rollers. The conveying belt performs rotational motion in a case that the conveying motor provides power.

In some embodiments, limiting baffles 10 are disposed on two sides of the conveying belt of the first belt conveyor 8 along a length direction, and are configured to limit a moving path of the rock wool block and prevent the rock wool block from falling off. One of the limiting baffles 10 is fixed to the back of the storage box 7, and the other limiting baffle 10 is fixed to the vertical section of the carrier plate. A connecting rod 9 is fixed above the middle of the two limiting baffles 10 to enable the rock wool block to lie flat and pass through. A concave slide way 11 whose left end is higher than right end is disposed at the right end of the first belt conveyor 8. The left end of the concave slide way 11 is connected to the limiting baffle 10, and the right end of the concave slide way 11 is directly opposite to the orientation adjusting pipe 13.

Figure 3:
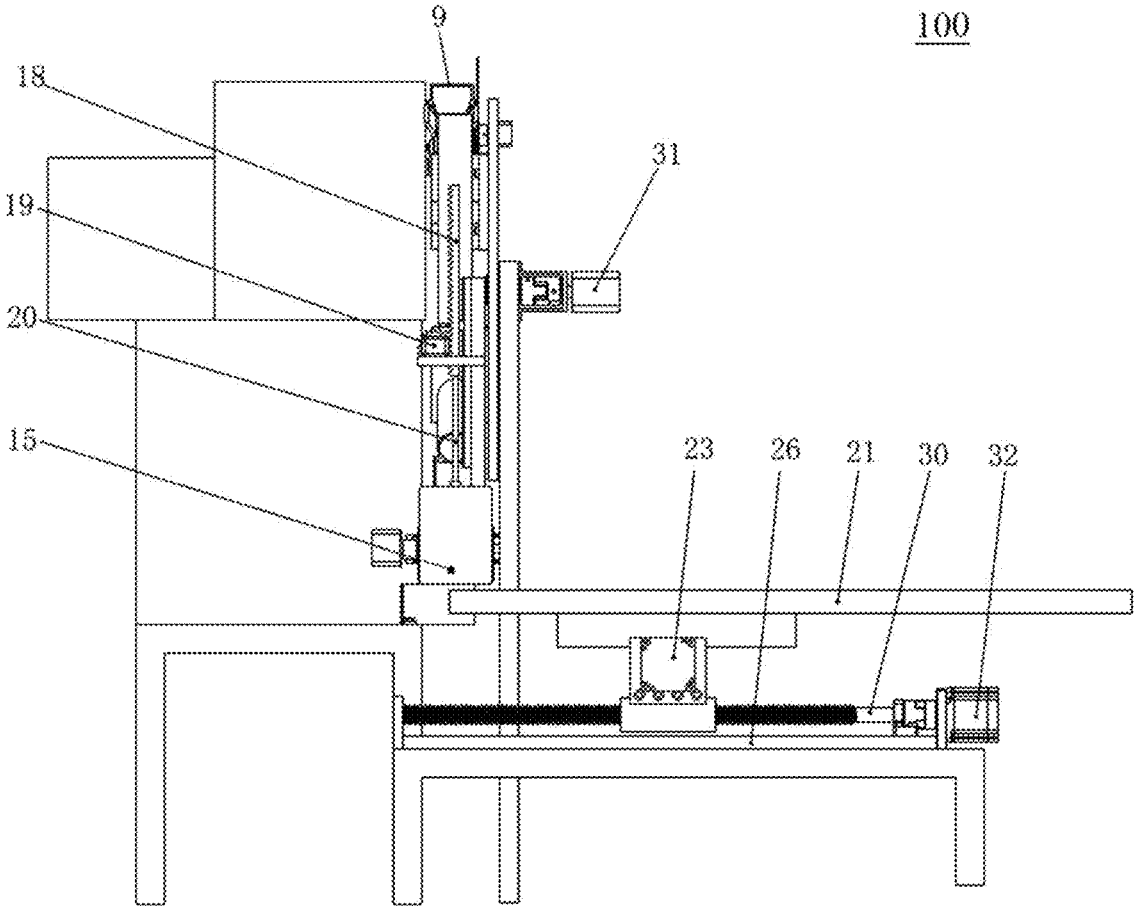
FIG. 3 is a right view of the filling apparatus in the present disclosure.
Figure 4:
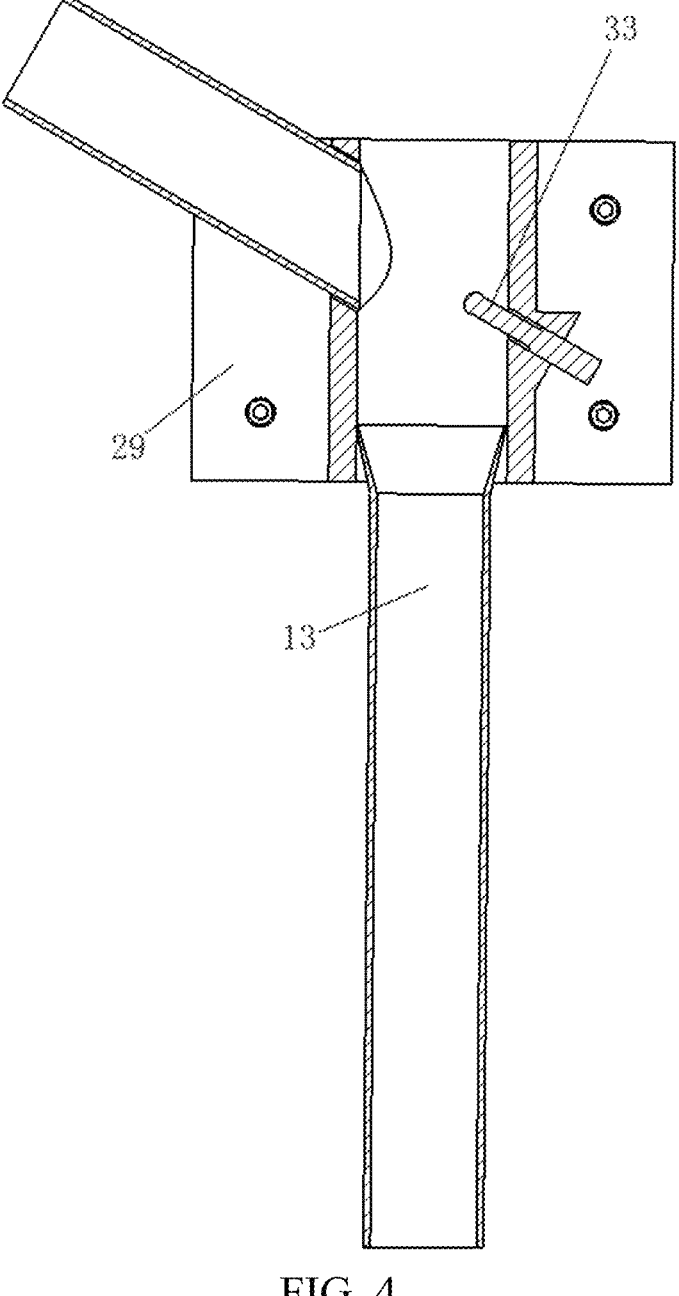
FIG. 4 is a cross-sectional view of an orientation adjusting pipe in the present disclosure.
Figure 5:
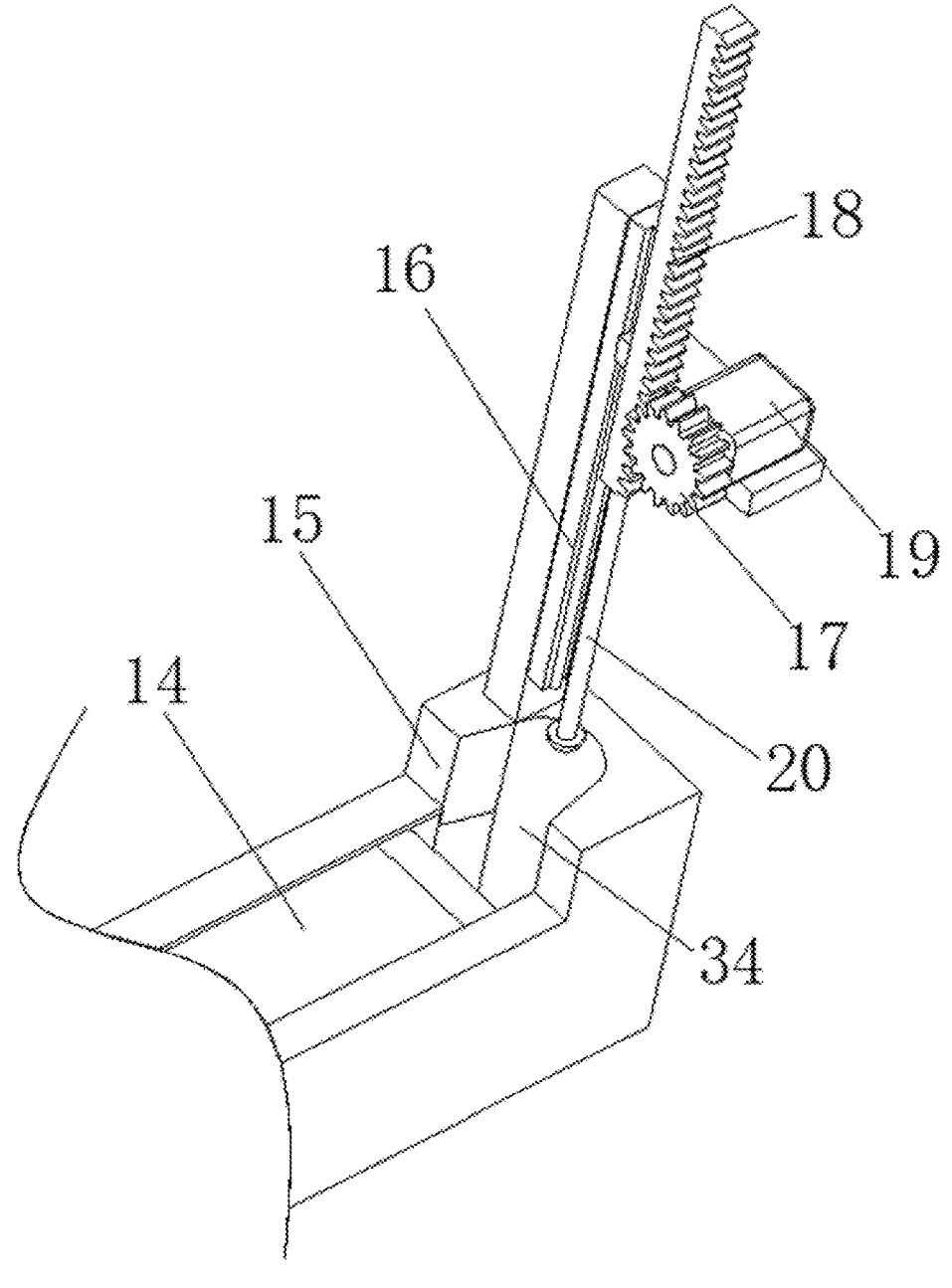
FIG. 5 is a schematic view of a second belt conveyor and a pressing mechanism in the present disclosure.

Referring to FIG. 1 to FIG. 4, the orientation adjusting mechanism 60 is configured to adjust an orientation of the rock wool block to enable the rock wool block to fall out from the orientation adjusting pipe 13 and fall onto the second belt conveyor 14 in a forward state that "a concave arc surface faces upwards and a flat surface faces downwards". The orientation adjusting mechanism 60 includes a fixed support 15, a circular disk 12, an orientation adjusting pipe 13, a retaining post 33, an orientation adjusting motor 31, and a second belt conveyor 14. The fixed support 15 is fixed to the first bracket 101. The fixed support 15 includes a horizontal rail and a vertical rail having an upper part. The orientation adjusting motor 31 is fixed on the vertical rail through a concave plate, that is, the orientation adjusting motor 31 is fixed to the upper part of the fixed support 15. An output shaft of the orientation adjusting motor 31 is connected to the circular disk 12 through the fixed support 15. The circular disk 12 is provided with two fixed blocks 29. Each fixed block 29 is provided with an orientation adjusting pipe 13 that is "bent at an obtuse angle". An included angle between a feed inlet and a feed outlet of the orientation adjusting pipe 13 is an obtuse angle. The two orientation adjusting pipes 13 are disposed in opposite directions. The two orientation adjusting pipes 13 are arranged symmetrically around the center of the circular disk 12. Referring to FIG. 4, at a corner of the orientation adjusting pipe 13, a retaining post 33 inclined to a direction of the feed inlet is provided. The retaining post 33 is disposed in a clamping slot of the fixed block 29. The retaining post 33 is configured to block the rock wool block in a reverse state from falling out from the feed outlet directly along the pipeline. The rock wool block falling into the pipe from the feed inlet of the orientation adjusting pipe 13 in a forward state can fall out from the feed outlet directly along the pipe, and the rock wool block falling into the pipe in a reverse state is blocked by the retaining post 33 and can fall out along an original path until the feed inlet of the orientation adjusting pipe 13 rotates downwards. A second belt conveyor 14 extending left and right is disposed at a lower part of the fixed support 15 or the horizontal rail of the fixed support. A gap 34 for one rock wool block in a vertical state to pass through is disposed between a right end of a conveying belt in the second belt conveyor 14 and a right end of the fixed support 15. The rock wool block falling out from the orientation adjusting pipe 13 falls onto the second belt conveyor 14 and falls onto the seedling raising tray 21 through the gap 34.

In some embodiments, an included angle between the axis of the retaining post 33 and the axis of the feed outlet of the orientation adjusting pipe 13 is 45°.

In some embodiments, the length of the retaining post 33 is adjustable, so that the rock wool block apparatus 100 of the present disclosure can be applied to rock wool blocks of different diameters.

In some embodiments, the shape of an end of the retaining post 33 extending into the orientation adjusting pipe 13 is a convex arc surface, so that the retaining post 33 can better cooperate with the rock wool block. The retaining post 33 is made of a rubber material to avoid damage to the rock wool block.

In some embodiments, two fixed rail baffles 28 for limiting moving tracks of rock wool blocks are disposed on the fixed support 15 right below the orientation adjusting pipe 13, and the two fixed rail baffles 28 are respectively disposed on two sides of the conveying belt of the second belt conveyor 14 along a length direction.

In some embodiments, the specific structure of the second belt conveyor 14 is the same as the specific structure of the first belt conveyor 8, and is also a roller conveying belt structure. Details are not described herein again.

Referring to FIG. 1, FIG. 2, FIG. 3 and FIG. 5, the pressing mechanism 70 is disposed at the right end of the fixed support 15, and includes a vertical plate disposed on the fixed support 15. A pressing motor 19 is fixed to the vertical plate by a motor fixing seat. A pressing gear 17 is connected to an output shaft of the pressing motor 19. The vertical plate is provided with a slide rail 16. The slide rail 16 is provided with a pressing rack 18 meshed with the pressing gear 17. A pressing rod 20 disposed directly opposite to the gap 34 is fixed at a lower end of the pressing rack 18. The pressing rod 20 can be driven by the pressing motor 19 to move up and down, so as to press the rock wool block into a hole to be filled in the seedling raising tray 21.

In some embodiments, an end of the pressing rod 20 that is in contact with the rock wool block is a convex arc surface, and is made of a soft rubber material, and the shape thereof is complementary to the shape of the concave arc surface of one end of the rock wool block.

Referring to FIG. 2, the seedling raising tray moving mechanism 80 is disposed on the second bracket 102 and includes a longitudinal driving component and a transverse driving component disposed on the longitudinal driving component. The hole to be filled in the seedling raising tray 21 can be moved to a position right below the gap 34 by the transverse driving component and the longitudinal driving component.

Referring to FIG. 1, FIG. 2 and FIG. 3, the longitudinal driving component includes a first bottom plate 26 disposed on the second bracket 102, a longitudinal movement motor 32 fixed to the first bottom plate 26, a first lead screw 30 connected to a transmission shaft of the longitudinal movement motor 32, and a first supporting component 27 having built-in threads disposed on the first lead screw 30.

The transverse driving component is disposed on the first supporting component 27, and includes a second bottom plate 24 disposed on the first supporting component 27, a transverse movement motor 23 fixed to the second bottom plate 24, a second lead screw 22 connected to a transmission shaft of the transverse movement motor 23, and a second supporting component 25 having built-in threads disposed on the second lead screw 22. A fixed tray is disposed above the second supporting component 25. The seedling raising tray 21 is disposed on the fixed tray.

In some embodiments, the automatic rock wool block filling apparatus 100 is provided with a controller 40 electrically connected to each motor, and rotation of each motor is controlled by the controller 40. The automatic rock wool block filling apparatus 100 is further provided with visual identification systems 90a, 90b on the feeding mechanism 50 and the orientation adjusting mechanism 60, respectively to detect the position and the movement of the rock wool blocks. For example, a first visual identification system 90a may be disposed at a position that is capable of detecting the rock wool blocks in the storage box 7 and the movement of rock wool blocks. A second visual identification system 90b may be disposed at a position to detect the position of the rock wool blocks, the position of the inlet and outlet of the orientation adjusting pipe 13, rotation of circular disk 12. The visual identification systems 90*a*, 90*b* may be any appropriate system such as a camera system and an image sensor system that is able to visualize the position and motion of the rock wool blocks during the filing operation and communicate the detected information to the controller 40. By means of cooperation between the controller 40 and the visual identification systems 90*a*, 90*b*, the rock wool block on the first belt conveyor 8 can fall into the orientation adjusting pipe 13, and the rock wool block falling from the second belt conveyor 14 can fall to the target position of the seedling raising tray 21. The visual identification systems 90*a*, 90*b* are respectively disposed at proper positions of the feeding mechanism 50 and the orientation adjusting mechanism 60.

A specific method for using the automatic rock wool block filling apparatus 100 provided in the present disclosure includes: disordered rock wool blocks are placed in the storage box 7 first: the output shaft of the feeding motor 3 rotates to drive the feeding gear 4 to rotate, so as to mesh with the feeding rack 5 to drive the push-pull plate 704 to move up and down: the rock wool block stepwise moves up onto the conveying belt of the first belt conveyor 8 along the fixed plate 703 and the push-pull plate 704: the rock wool blocks continuously move on the first belt conveyor 8, and falls into the orientation adjusting pipe 13 by the concave slide way 11; and the output shaft of the orientation adjusting motor 31 rotates to drive the circular disk 12, so as to drive the orientation adjusting pipe 13 to rotate counterclockwise. For the ends with concave arc surfaces of all rock wool blocks to face the same orientation, the orientation adjustment includes two scenarios. When falling in a forward state that "a concave arc surface faces upwards and a flat surface faces downwards", after the rock wool block is in contact with the retaining post 33, the rock wool block directly slides out from the feed outlet at the lower end of the orientation adjusting pipe 13 with the rotation of the circular disk 12, and in this case, the rock wool block falls onto the second belt conveyor 14 in a forward state. When falling in a reverse state that "a concave arc surface faces downwards and a flat surface faces upwards", the rock wool block is blocked when the rock wool block is in contact with the retaining post 33. As the circular disk 12 continues to rotate, when the orientation adjusting pipe 13 rotates until the feed inlet faces downwards, the rock wool block slides out along an original path. In this way, the rock wool block also falls onto the second belt conveyor 14 in a forward state. Under the action of the second belt conveyor 14, the rock wool block moves into the gap 34 to fall off. At the same time, the output shaft of the pressing motor 19 rotates to drive the pressing gear 17 to rotate, and the pressing gear 17 is meshed with the pressing rack 18 to drive the pressing rod 20 to move up and down, so as to press the rock wool block into the hole to be filled in the seedling raising tray 21. After a single press is completed, the output shaft of the transverse movement motor 23 rotates to drive the second lead screw 22 to rotate, so as to drive the seedling raising tray 21 to move left and right by a transverse hole spacing. After filling of an entire row is completed, the output shaft of the longitudinal movement motor 32 rotates to drive the first lead screw 30 to rotate, so as to drive the seedling raising tray 21 to move forward and backward by a longitudinal hole spacing. The operations are repeated until the entire seedling raising tray 21 is filled.

Figures 6, 7:
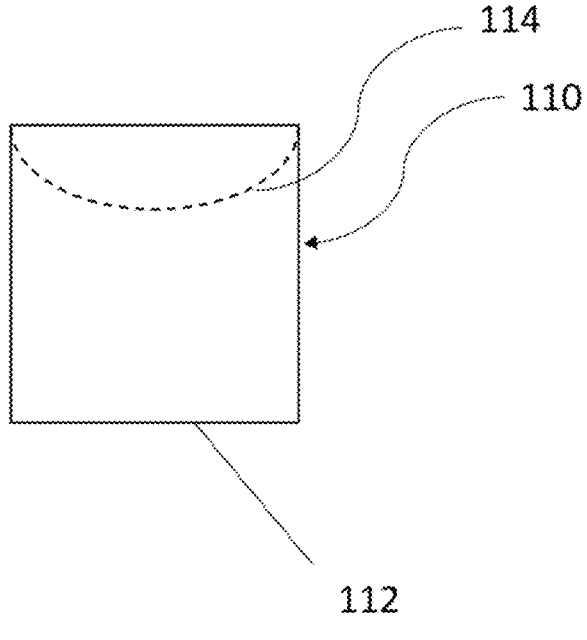
FIG. 6 is a schematic side view of a rock wool block in the present disclosure.
FIG. 7 is a schematic diagram of a rock wool block filing apparatus illustrating electrical connections among components in the present disclosure.

FIG. 7 is a schematic diagram of a rock wool block filing apparatus 100 illustrating electrical connections among components according to one embodiment of the present disclosure. Referring to FIG. 7 and with further reference to FIG. 2, the automatic rock wool block filling apparatus 100 includes a controller 40; a supporting mechanism 1: a feeding mechanism 50 disposed at a left end of the supporting mechanism 1 and including a push-plate feeding component electrically connected to the controller 40 and a first belt conveyor 8 disposed on a rear side of the push-plate feeding component and electrically connected to the controller 40); an orientation adjusting mechanism 60 disposed on the supporting mechanism 1 and located on a right side of the first belt conveyor 8 and configured to adjust an orientation of the rock wool block, wherein the orientation adjusting mechanism 60 includes a fixed support 15 fixed to the supporting mechanism 1, an orientation adjusting motor 31 electrically connected to the controller 40 is disposed at an upper part of the fixed support 15, a second belt conveyor 14 electrically connected to the controller 40 is disposed at a lower part of the fixed support 15: a pressing mechanism 70 disposed at a right end of the fixed support 15 and including a vertical plate disposed on the fixed support 15, wherein a pressing motor 19 electrically connected to the controller 40 is fixed to the vertical plate by a motor fixing seat: a seedling raising tray moving mechanism 80 disposed at a right end of the supporting mechanism 1 and configured to support and move the seedling raising tray 21, wherein the seedling raising tray moving mechanism 80 includes a longitudinal driving component electrically connected to the controller 40 and a transverse driving component disposed on the longitudinal driving component and electrically connected to the controller 40; and two visual identification systems 90*a*, 90*b* disposed on the feeding mechanism and the orientation adjusting mechanism respectively, wherein by means of cooperation between the controller 40 and the visual identification systems 90*a*, 90*b*, the rock wool block on the first belt conveyor 8 just falls into the orientation adjusting pipe 13, and the rock wool block falling from second belt conveyor 14 just falls to the target position of the seedling raising tray 21.

The foregoing descriptions are merely preferred embodiments of the present disclosure, and are not intended to limit the present disclosure in any form. Any equivalent change or modification made according to the essence of the present disclosure shall fall within the scope of protection of the present disclosure.

What is claimed is:

1. An automatic rock wool block filling apparatus, a rock wool block being a cylinder as a whole, with one end being a concave arc surface, and the other end being a flat surface, the automatic rock wool block filling apparatus comprising:

a controller;

a supporting mechanism (1) for playing a supporting role;

a feeding mechanism, disposed at a left end of the supporting mechanism (1) and comprising a push-plate feeding component electrically connected to the controller and a first belt conveyor (8) disposed on a rear side of the push-plate feeding component and electrically connected to the controller, wherein the rock wool block is conveyed onto the first belt conveyor (8) by the push-plate feeding component and is then conveyed to an orientation adjusting mechanism by the first belt conveyor (8);

the orientation adjusting mechanism, disposed on the supporting mechanism (1) and located on a right side of the first belt conveyor (8), configured to adjust an orientation of the rock wool block to enable the rock wool block to fall from the orientation adjusting mechanism onto a seedling raising tray (21) in a forward state where the concave arc surface faces upwards and the flat surface faces downwards, and comprising a fixed support (15) fixed to the supporting mechanism (1), wherein an orientation adjusting motor (31) electrically connected to the controller is disposed at an upper part of the fixed support (15), a second belt conveyor (14) electrically connected to the controller is disposed at a lower part of the fixed support (15), a gap (34) only for one rock wool block in a vertical state to pass through is disposed between a right end of a conveying belt in the second belt conveyor (14) and a right end of the fixed support (15), an output shaft of the orientation adjusting motor (31) extends through the fixed support (15) and connects to a circular disk (12), the circular disk (12) is provided with two orientation adjusting pipes (13) that are arranged symmetrically around the center of the circular disk (12), an included angle between a feed inlet and a feed outlet of the orientation adjusting pipe (13) is an obtuse angle, at a corner of the orientation adjusting pipe (13), a retaining post (33) inclined to a direction of the feed inlet is provided, the rock wool block falling into the orientation adjusting pipe (13) in a forward state from the feed inlet of the pipe can fall out from the feed outlet onto the second belt conveyor (14) directly along the pipe, the rock wool block falling into the pipe in a reverse state is blocked by the retaining post (33) and can only fall onto the second belt conveyor (14) along an original path until the feed inlet of the orientation adjusting pipe (13) rotates downwards, and the rock wool block falls onto the seedling raising tray (21) from the gap (34) under an action of the second belt conveyor (14); a pressing mechanism, disposed at a right end of the fixed support (15) and comprising a vertical plate disposed on the fixed support (15), wherein a pressing motor (19) electrically connected to the controller is fixed to the vertical plate by a motor fixing seat, a pressing gear (17) is connected to an output shaft of the pressing motor (19), the vertical plate is provided with a slide rail (16), the slide rail (16) is provided with a pressing rack (18) meshed with the pressing gear (17), a pressing rod (20) disposed directly opposite to the gap (34) is fixed at a lower end of the pressing rack (18), and the pressing rod (20) can be driven by the pressing motor (19) to move up and down, so as to press the rock wool block to a target position; a seedling raising tray moving mechanism, disposed at a right end of the supporting mechanism (1), configured to support and move the seedling raising tray (21), and comprising a longitudinal driving component electrically connected to the controller and a transverse driving component disposed on the longitudinal driving component and electrically connected to the controller, wherein a hole to be filled in the seedling raising tray (21) can be moved to a position right below the gap (34) by the transverse driving component and the longitudinal driving component; and two visual identification systems, disposed on the feeding mechanism and the orientation adjusting mechanism respectively, wherein by means of cooperation between the controller and the visual identification system, the rock wool block on the first belt conveyor (8) just falls into the orientation adjusting pipe (13), and the rock wool block falling from the second belt conveyor (14) just falls to the target position of the seedling raising tray (21);

wherein limiting baffles (10) for preventing rock wool blocks from falling off are disposed on two sides of the conveying belt of the first belt conveyor (8) along a length direction; and a connecting rod (9) is connected to the middle of the two limiting baffles (10), and the connecting rod (9) and the limiting baffles (10) enclose a space that allows only rock wool blocks in a horizontal state to pass through; wherein a concave slide way (11) whose left end is higher than a right end is obliquely disposed at a right end of the first belt conveyor (8), the left end of the concave slide way (11) is connected to the limiting baffle (10), and the right end of the concave slide way (11) is flush with a bottom of the feed inlet of the orientation adjusting pipe (13).

2. The automatic rock wool block filling apparatus according to claim 1, wherein the push-plate feeding component comprises a supporting frame (2) and a storage box (7) that are disposed at a left end of the supporting mechanism (1) and communicate with each other vertically, the first belt conveyor (8) is connected to a rear side of the storage box (7) by a carrier plate, the storage box (7) comprises two risers (702) disposed oppositely, a fixed bottom plate (701) vertically disposed at a front section of the two risers (702), and a stepped bottom plate vertically disposed at a rear section of the two risers (702), the stepped bottom plate comprises a plurality of fixed plates (703) and a plurality of push-pull plates (704) that are disposed between the two risers (702) in a staggered manner and are in stepped layout, a thickness of the fixed plate (703) equals to a diameter of the rock wool block, and a thickness of the push-pull plate (704) equals to the diameter of the rock wool block, the plurality of fixed plates (703) are fixedly connected between the two risers (702), and a feeding rack (5) extending vertically is fixed at lower end of the plurality of push-pull plates (704) by a connector (6); and a feeding motor (3) is disposed in the supporting frame (2), a feeding gear (4) is connected to an output shaft of the feeding motor (3), the feeding gear (4) is meshed with the feeding rack (5), and under the action of the feeding motor (3), the plurality of push-pull plates (704) synchronously move up and down relative to the fixed plates (703) to drive the rock wool block on the fixed bottom plate (701) to stepwise move up to the highest position of the stepped bottom plate and then roll down onto the first belt conveyor (8).

3. The automatic rock wool block filling apparatus according to claim 1, wherein an end of the retaining post (33) extending into the orientation adjusting pipe (13) is a convex arc surface.

4. The automatic rock wool block filling apparatus according to claim 1, wherein the orientation adjusting pipe (13) is fixed to the circular disk (12) by a fixed block (29), the fixed block (29) is provided with a clamping slot for mounting the retaining post (33), and a length of the retaining post (33) is adjustable.

5. The automatic rock wool block filling apparatus according to claim 1, wherein two fixed rail baffles (28) for limiting moving tracks of rock wool blocks are disposed on the fixed support (15) right below the orientation adjusting pipe (13), and the two fixed rail baffles (28) are respectively disposed on two sides of the conveying belt of the second belt conveyor (14) along a length direction.

6. The automatic rock wool block filling apparatus according to claim 1, wherein a lower end of the pressing rod (20) has a convex arc surface matched with the shape of the concave arc surface of the rock wool block.

7. The automatic rock wool block filling apparatus according to claim 1, wherein the pressing rod (20) and the retaining post (33) are both made of a rubber material.

8. The automatic rock wool block filling apparatus according to claim 1, wherein the transverse driving component and the longitudinal driving component both use a motor lead screw module.

\* \* \* \* \*